(12) United States Patent
Pedlar et al.

(10) Patent No.: US 10,569,778 B2
(45) Date of Patent: Feb. 25, 2020

(54) CREEP TORQUE AND ELECTRIC DRIVE IN MANUAL TRANSMISSION VEHICLES

(71) Applicant: FORD GLOBAL TECHNOLOGIES, LLC, Dearborn, MI (US)

(72) Inventors: Christopher Edward Pedlar, Chelmsford (GB); Anthemios Philemon Petridis, Bishop's Stortford (GB); David Hesketh, Ingatestone (GB)

(73) Assignee: FORD GLOBAL TECHNOLOGIES, LLC, Southfield, MI (US)

(*) Notice: Subject to any disclaimer, the term of this patent is extended or adjusted under 35 U.S.C. 154(b) by 345 days.

(21) Appl. No.: 15/728,101

(22) Filed: Oct. 9, 2017

(65) Prior Publication Data

US 2018/0099673 A1    Apr. 12, 2018

(30) Foreign Application Priority Data

Oct. 10, 2016    (GB) .................................. 1617150.6

(51) Int. Cl.
*B60W 30/18*    (2012.01)
*B60K 6/52*    (2007.10)
(Continued)

(52) U.S. Cl.
CPC ......... *B60W 30/18063* (2013.01); *B60K 6/48* (2013.01); *B60K 6/52* (2013.01);
(Continued)

(58) Field of Classification Search
CPC ......... B60W 30/18063; B60W 50/082; B60W 30/18018; B60W 30/16; B60W 10/08;
(Continued)

(56) References Cited

U.S. PATENT DOCUMENTS

2003/0221881 A1    12/2003 Lee
2016/0031431 A1    2/2016 Johri et al.
(Continued)

FOREIGN PATENT DOCUMENTS

CN    204845517 U    12/2015

OTHER PUBLICATIONS

Great Britain Combined Search and Examination Report for Great Britain Application No. 1617150.6 dated Mar. 14, 2017.

*Primary Examiner* — Mary Cheung
(74) *Attorney, Agent, or Firm* — Brooks Kushman P.C.; David Kelley

(57) ABSTRACT

A vehicle having a manual transmission, adaptive cruise control, and an electric motor/generator includes electric creep and electric crawl modes that use the electric motor/generator to propel the vehicle when in traffic. Creep mode may be enabled and the engine stopped automatically when the transmission is in neutral and the vehicle is stationary. Crawl mode may be activated when the creep mode and the adaptive cruise control are enabled to use the electric motor/generator and adaptive cruise control to maintain a target distance to a forward vehicle. The creep mode may be canceled responsive to brake pedal activation. The creep mode and crawl mode may be canceled and the engine started responsive to clutch pedal or accelerator pedal activation. The creep mode and crawl mode may be deactivated responsive to battery charge level being below a threshold.

20 Claims, 6 Drawing Sheets

(51) Int. Cl.
  *B60K 6/48* (2007.10)
  *B60K 6/547* (2007.10)
  *B60W 10/06* (2006.01)
  *B60W 10/08* (2006.01)
  *B60W 30/16* (2020.01)
  *B60W 50/08* (2020.01)

(52) U.S. Cl.
  CPC ............. *B60K 6/547* (2013.01); *B60W 10/06* (2013.01); *B60W 10/08* (2013.01); *B60W 30/16* (2013.01); *B60W 30/18018* (2013.01); *B60W 50/082* (2013.01); *B60W 2510/101* (2013.01); *B60W 2510/244* (2013.01); *B60W 2520/04* (2013.01); *B60W 2540/04* (2013.01); *B60W 2540/10* (2013.01); *B60W 2540/12* (2013.01); *B60W 2540/14* (2013.01); *B60W 2540/16* (2013.01); *B60W 2550/306* (2013.01); *Y02T 10/6221* (2013.01); *Y02T 10/6265* (2013.01); *Y02T 10/6286* (2013.01); *Y02T 10/7258* (2013.01)

(58) Field of Classification Search
  CPC ............. B60W 10/06; B60W 2540/04; B60W 2550/306; B60W 2540/16; B60W 2540/14; B60W 2540/12; B60W 2540/10; B60W 2520/04; B60W 2510/244; B60W 2510/101; B60W 30/14; B60W 20/00; B60W 20/40; B60W 10/04; B60W 20/15; B60K 6/547; B60K 6/48; B60K 6/52; B60L 15/2063; Y02T 10/6221; Y02T 10/6265; Y02T 10/7258; Y02T 10/6286
  See application file for complete search history.

(56) References Cited

U.S. PATENT DOCUMENTS

2016/0244039 A1* 8/2016 Rizzo ..................... B60T 8/322
2018/0099674 A1* 4/2018 Jerger ................. B60W 30/181
2018/0208175 A1* 7/2018 Zhang .................. B60W 20/12
2019/0025820 A1* 1/2019 Ferguson ............... G08G 1/143

* cited by examiner

CREEP TORQUE AND ELECTRIC DRIVE IN MANUAL TRANSMISSION VEHICLES

CROSS-REFERENCE TO RELATED APPLICATIONS

This application claims foreign priority benefits under 35 U.S.C. § 119(a)-(d) to GB Application 1617150.6 filed Oct. 10, 2016, which is hereby incorporated by reference in its entirety.

TECHNICAL FIELD

This disclosure relates to strategies for providing creep torque and electric drive traffic crawl in a manual transmission vehicle.

BACKGROUND

One of the considerable benefits of automatic transmission is the ability to creep forward in heavy traffic by simply releasing the foot brake. In contrast, a manual transmission vehicle has to be eased gently forward under control from the accelerator, brake and clutch pedals, which quickly becomes tiresome for the driver.

Automatic transmission vehicles that are also equipped with adaptive cruise control ("ACC") sometimes have stop/start functionality which allows the vehicle to autonomously follow the vehicle in front. In slow moving traffic ACC start/stop functionality also provides traffic crawl functionality avoiding the need for the driver to continually modulate the brake pedal to keep up with traffic. Traffic crawl functionality is not available on manual transmission vehicles because clutch, brake, and gear shifting have to be controlled by the driver.

Continuous modulation of the accelerator, brake, and clutch pedals when driving a manual transmission vehicle in heavy traffic is also not efficient from the perspective of fuel economy.

The issue of fuel economy under such conditions has been addressed by the introduction of engine start-stop technology which typically requires the transmission to be in neutral for the engine to stop for manual transmission vehicles. As a result, in a manual transmission vehicle with start-stop technology, the user not only has to control forward motion with accelerator, brake, and clutch, but also has to shift to neutral when the vehicle stops. The repeated shifting from neutral to first gear, the repeated stopping and starting of the engine and the requirement to operate accelerator, brake and clutch combine to create an unsatisfactory experience for the driver.

In addition, hybrid electric vehicles (HEVs) typically have multiple power sources, i.e. an internal combustion engine and an electric motor. The role of the electric motor differs depending on the type of hybrid vehicle.

SUMMARY

According to the one or more embodiments of this disclosure, a system for providing electric creep and electric drive traffic crawl in a manual transmission vehicle having adaptive cruise control includes a vehicle comprising an accelerator pedal, a brake pedal and a clutch pedal, the vehicle also being provided with a combustion engine which is the primary source of power under normal operation, and an electric motor/generator for providing low speed motive force for the vehicle when one or both of electric creep or electric drive traffic crawl is activated. The system is configured to turn off the combustion engine and enable electric creep when the vehicle is stationary and the vehicle transmission is in neutral. The system is further configured to activate electric drive traffic crawl when adaptive cruise control and electric creep are both initiated and the combustion engine is turned off. The system is further configured to exit electric drive traffic crawl when the brake pedal is activated, and the system is further configured to exit electric drive traffic crawl and electric creep and restart the combustion engine when the accelerator pedal or clutch pedal is activated.

The combination of electric creep and electric drive traffic crawl functionality in a manual transmission vehicle offers an enhanced driving experience when driving at slow speed, such as in heavy traffic. Electric creep provides low speed motive force to a vehicle and enables a driver to modulate the vehicle speed solely through use of the brake pedal. Electric drive traffic crawl enables the vehicle to maintain a set distance behind the vehicle in front without use of the vehicle pedals. Such a combination of functionality results in easier driving conditions for the driver and reduced fatigue. Furthermore, low speed electric propulsion provided by electric creep and electric drive traffic crawl provides greater control over the vehicle than is possible with a conventional manual transmission vehicle and contributes to increased fuel efficiency.

The system may comprise a control button for manually activating electric creep.

Electric creep may not be useful in all driving conditions. Therefore, it is advantageous for a user to have the option whether to activate electric creep.

In a manual transmission vehicle in which the gear selection is controlled by a gear lever, the electric creep control button may be a control button provided on the gear lever.

The provision of a control button on the gear lever is intuitive for the driver as the heavy, stop/start traffic conditions in which the electric creep functionality will be used will necessitate changing gear and therefore the driver's hand will necessarily be on the gear lever anyway.

The system may comprise a control button for activating adaptive automatic crawl (AAC).

The system may be further configured to cancel the electric creep and/or electric drive traffic crawl functions on the basis of a further user action, which may comprise one or more of the following, individually or in combination: unbuckling of a driver's seat belt; opening of a driver's door and moving the gear lever from a neutral position to a forward or reverse gear position.

The system may be further configured to cancel the electric creep and electric drive traffic crawl functions if the level of charge in the battery reaches a predetermined threshold level, i.e. the level of battery charge is depleted below a pre-determined state of charge such that use of the electric function could result in the electric machine, potentially including the starter motor, being non-functional.

There may be occasions when it is not convenient for the driver to cancel electric creep by the depression of the accelerator or clutch pedals and electric drive traffic crawl by depression of the brake pedal. For example, if the driver is required to leave the vehicle or to attend to rear seat passengers, it is important that the vehicle does not accidentally continue to creep/crawl just because the brake is not depressed. As a contribution to a fail-safe operating regimen, the electric creep/electric drive traffic crawl facilities can be configured to be cancelled on the basis of other key indicators which are indicative of the absence of the driver from the driving position.

In addition, the motor providing the electric creep/electric drive traffic crawl functions can be configured to provide either forward or backward movement of the vehicle. This means that, in addition to the primary use of the system in heavy traffic where the vehicle needs to make numerous small, low speed movements to keep up with the slow-moving traffic, the system can also be deployed to aid the parking of the vehicle. The provision of forward and backward motion would enable the vehicle to be parked entirely under the power of the electric motor without any assistance from the combustion engine. This is particularly advantageous when the vehicle is being parked inside a building, such as a garage, so engine fumes do not permeate through the building.

To facilitate the selection of forward or backward motion, the button on the gear lever may have a rocker or slide function to enable the user to select between forward and backward motion. This switch should be set to default to forward motion as this is the predominant use of the system.

The electric machine or motor used to provide the electric creep/electric drive traffic crawl may have a power rating in the region of 10 KW or greater and will be connected to the output shaft of the transmission or rear axle. The electric machine may be part of a mild hybrid facility also providing energy recovery, load shifting, and launch assistance.

Furthermore, according to various embodiments, a controller for providing electric creep and electric drive traffic crawl in a manual transmission vehicle having adaptive cruise control is associated with a vehicle comprising a combustion engine and an electric motor/generator, wherein the vehicle is controlled by accelerator, brake, and clutch pedals, and the controller is configured to: switch off the combustion engine when the vehicle is stationary and the vehicle transmission is in neutral; enable electric creep when the combustion engine is switched off by the controller; activate electric drive traffic crawl when both electric creep and adaptive cruise control are activated; cancel electric drive traffic crawl on activation of the brake pedal; and cancel electric creep and electric drive traffic crawl on activation of the accelerator pedal or clutch pedal.

The claimed subject matter will now be further and more particularly described, by way of example only, and with reference to the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
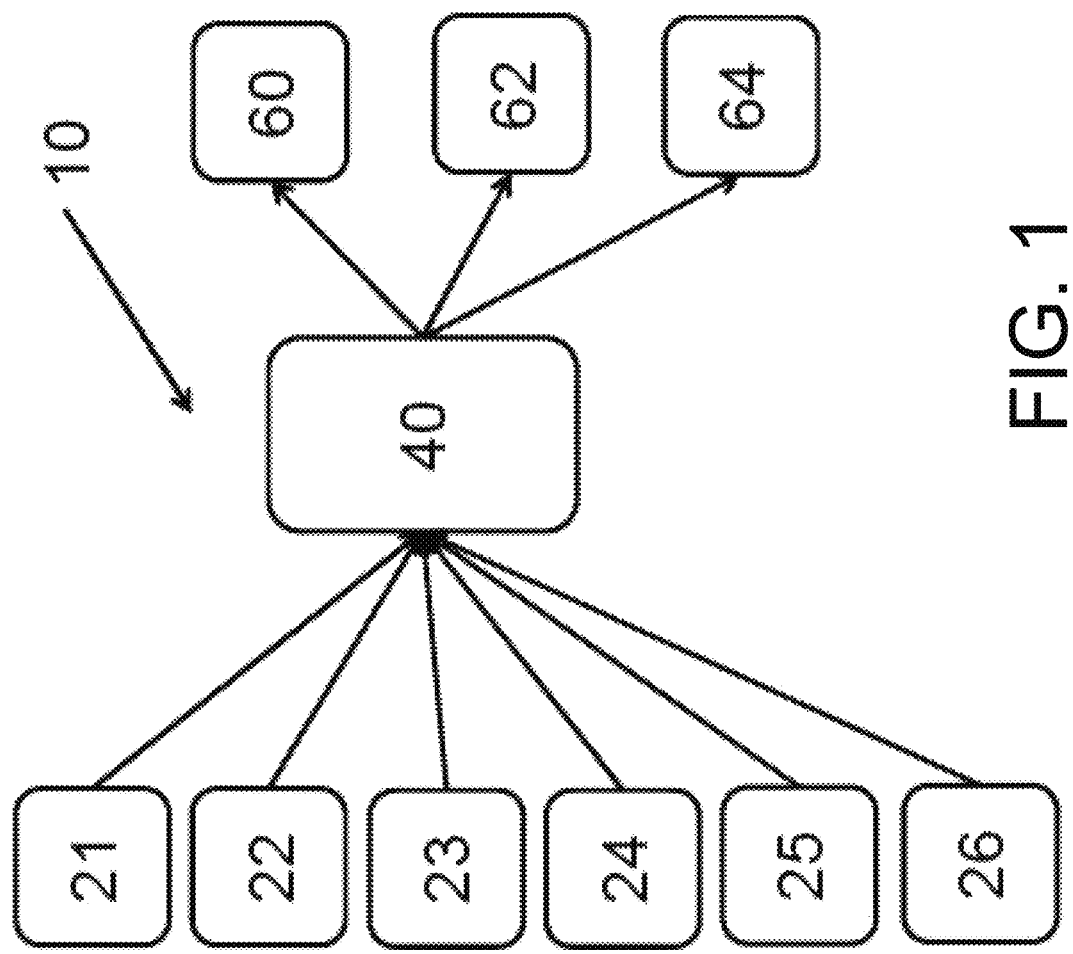
FIG. 1 shows schematically the constituent parts of an example of one or more embodiments.

FIG. 1 shows schematically the constituent parts of an example configuration for one or more embodiments of a system 10 of the present disclosure. The system 10 is implemented within a powertrain control module 40. The powertrain control module 40 is configured to receive data from a plurality of sensors positioned in different locations around the vehicle. Data received from some of the sensors can be used by the powertrain control module 40 to implement an electric creep and electric drive traffic crawl functionality.

An accelerator pedal position sensor 21, brake pressure or wheel torque sensor 22, and clutch pedal or clutch position sensor 23 provide data indicative of the extent of depression of the respective pedal. While the data provided by the sensor will include data indicative of the extent of depression of the respective pedal, the system 10 requires only a subset of that data showing whether there is any depression of the pedal or not.

Gearbox position sensor 24 provides data about the position of the gear lever, in particular whether the gear lever is in the neutral position or not. Of course, other position information may be provided depending upon the particular application and implementation, such as the selected gear, or whether the position corresponds to a forward gear or reverse gear, for example.

An electric creep driver control switch 25 is provided. The switch 25 can be a binary switch with "on" and "off" positions. Alternatively, switch 25 may be a rocker switch with "forward", "reverse" and "off" positions, for example.

An AAC driver control switch 26 may also be provided. The AAC switch 26 is used to activate AAC which may or may not be active when electric creep is activated. Some vehicles automatically activate AAC when the combustion engine is started, but others may require the driver to manually activate AAC.

Further sensors (not specifically shown) may collate data indicative of the driver potentially leaving the vehicle. These can include a sensor monitoring engagement of the driver's seat belt and a sensor monitoring for the opening of the driver's door, for example.

It will be appreciated that the accelerator, brake, and clutch pedals sensors 21, 22, 23 are configured to provide data to the powertrain control module 40 for the normal functioning of this module. Furthermore, a seat belt engagement sensor is typically provided to provide a warning should the driver attempt to drive the car without fastening the seat belt. Additional sensors are not required at these locations for the deployment of the system 10. However, the powertrain control module 40 must be configured to receive and interpret the data appropriately for the deployment of the electric creep and electric drive traffic crawl functionality.

The deployment of the electric creep and electric drive traffic crawl functionality is achieved via an electric motor 60 that is integrated into the propulsion system of the vehicle. The electric motor 60 provides motive force to the vehicle when electric creep or electric drive traffic crawl functions are deployed.

The powertrain control module 40 additionally provides data to an electric creep and electric drive traffic crawl driver interface 62. This interface 62 may be embodied as a lamp, telltale, or message within the instrument cluster or it may be embodied through a vehicle infotainment system.

In addition, the powertrain control module 40 provides data to a module 64 configured to control the reversing lamp. This ensures that when the electric creep system is deployed in the reverse direction, the vehicle's reversing lights are deployed just as they would be if the vehicle was being reversed under power from the combustion engine.

Figure 2A:
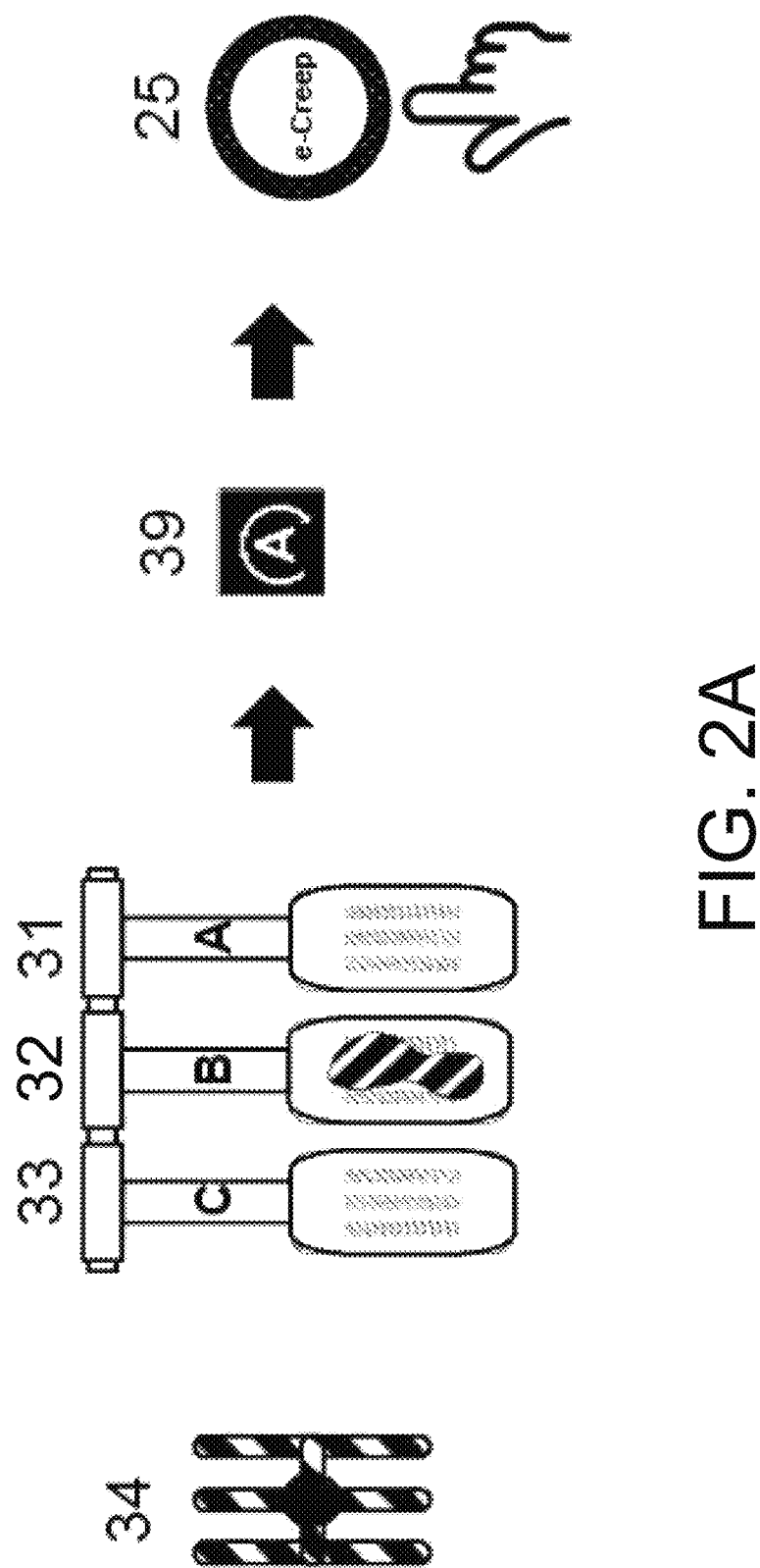
FIG. 2A shows representative electric creep entry conditions.

FIG. 2A summarizes the entry conditions for the system 10 in electric creep mode only. The gear lever 34 must be in the neutral position; the accelerator pedal 31 and clutch pedal 33 must be fully released, i.e. not depressed at all. This configuration results in the initiation of the auto-stop functionality 39. Once the combustion engine has been auto-stopped, then if the electric creep control switch 25 is activated and the brake pedal 32 is depressed, the vehicle will enter an electric creep mode. In this mode, the electric creep torque is controlled solely by the modulation of the brake pedal 32. If the electric creep control switch 25 includes forward and reverse options, then the creep torque will move the vehicle either forward or backward depending on the position of the switch 25.

Figure 2B:
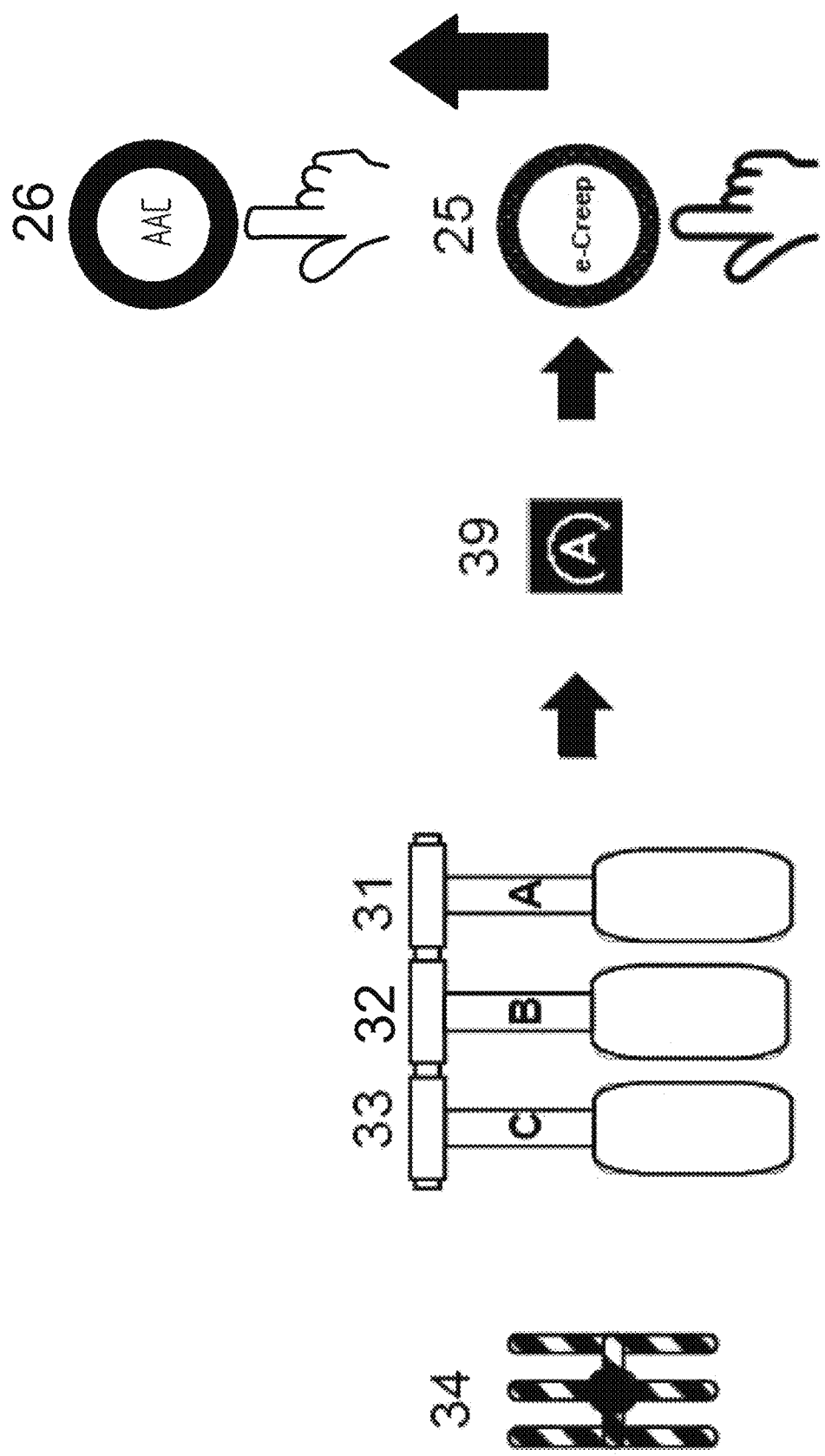
FIG. 2B shows representative electric drive traffic crawl entry conditions.

FIG. 2B summarizes the entry conditions for the system 10 in electric creep and electric drive traffic crawl mode. The gear lever 34 must be in the neutral position; the accelerator pedal 31 and clutch pedal 33 must be fully released, i.e. not depressed at all. Once the vehicle auto-stop functionality 39 has initiated to auto-stop the combustion engine and electric creep has been initiated by use of the electric creep control switch 25 and depression of the brake pedal 32, electric drive traffic crawl may be initiated by fully releasing the brake pedal 32 and activating the vehicle AAC system using the AAC switch 45.

Figure 3A:
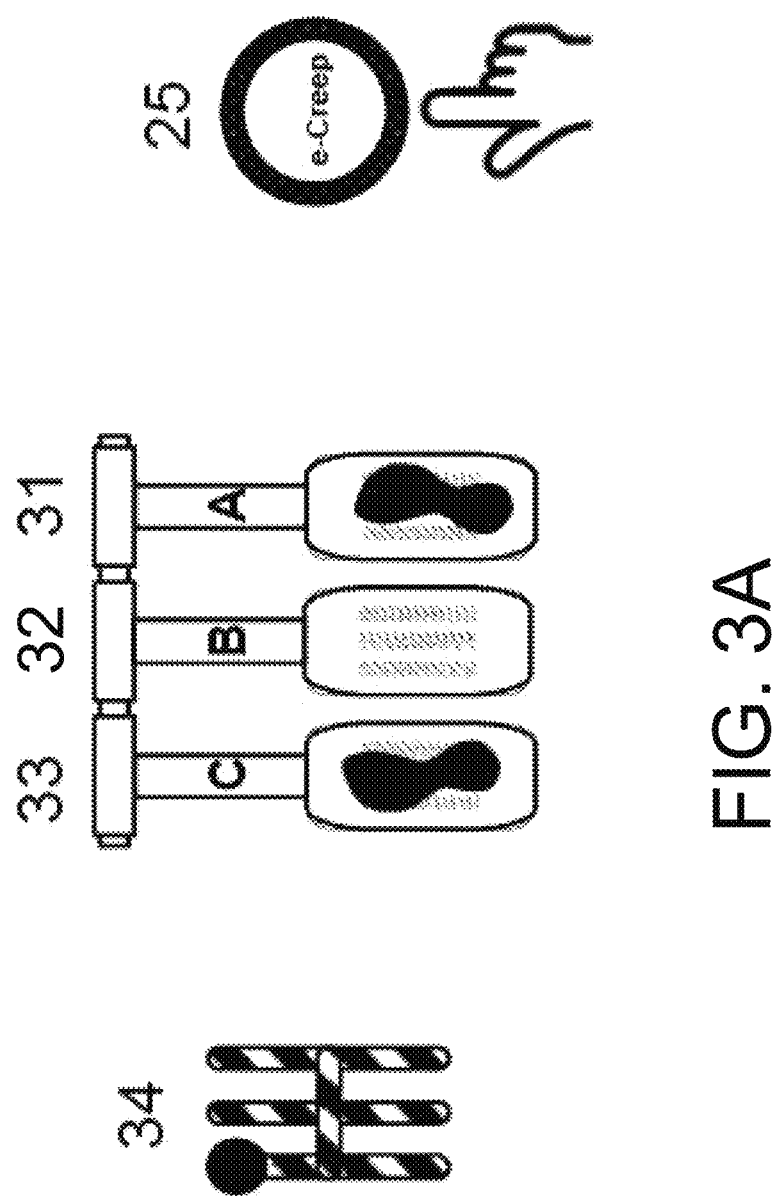
FIG. 3A shows representative electric creep exit conditions.

FIG. 3A summarizes the exit conditions for the system 10 in electric creep mode only. Electric creep will be cancelled if any one of the following conditions is met: moving the gear lever 34 out of the neutral position; the accelerator pedal 31 or clutch pedal 33 is depressed; or the electric creep control switch 25 changes state, which determination may depend on the type of control switch being utilized. If the control switch 25 is a slider or non-latching button with three positions, "forward," "reverse" and "off," then the system 10 is cancelled when the button or slider is moved to the "off" position.

Figure 3B:
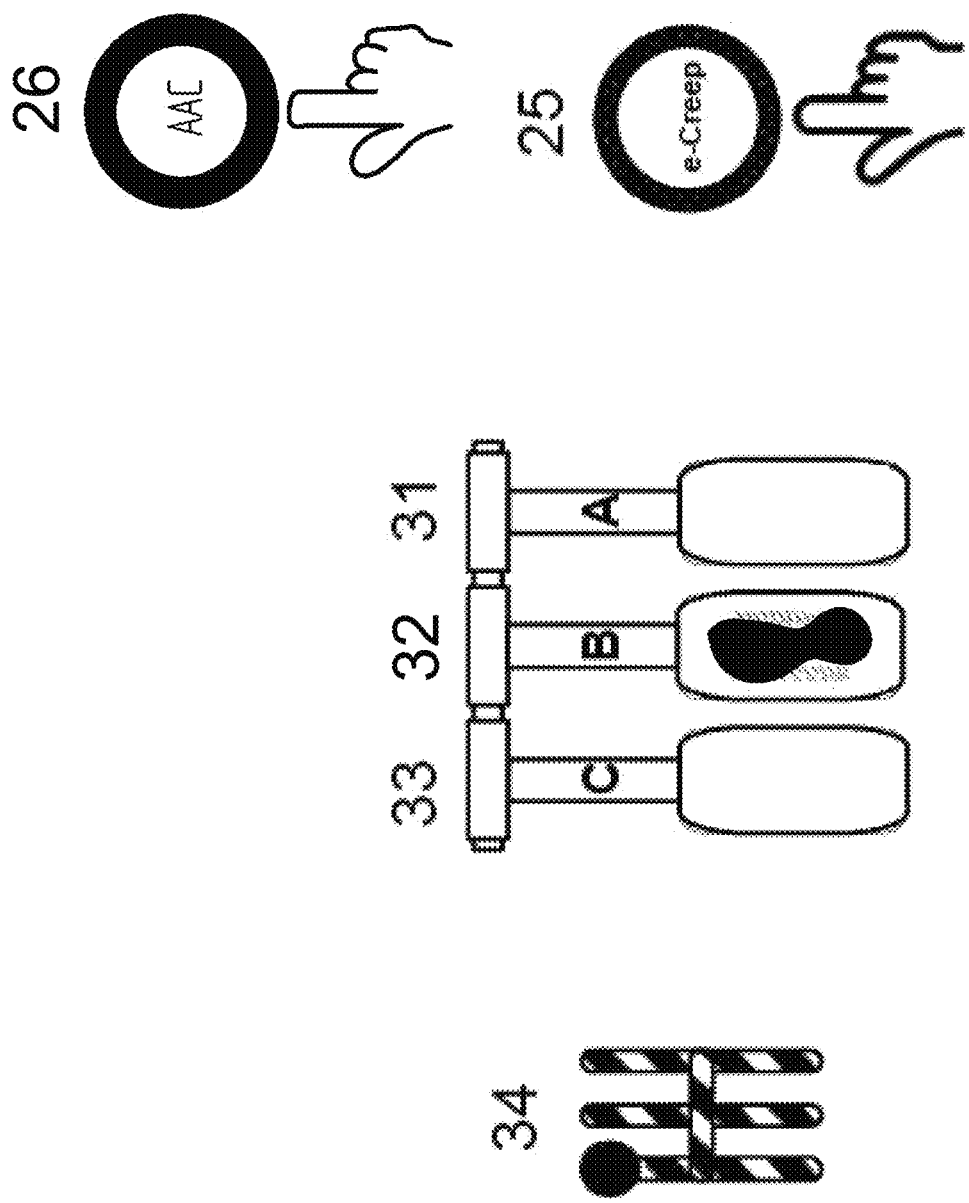
FIG. 3B shows representative electric drive traffic crawl exit conditions.

FIG. 3B summarizes the exit conditions for the system 10 in electric drive traffic crawl mode. Electric drive traffic crawl will be cancelled if the brake pedal 32 is depressed, if the AAC switch 45 is activated or if electric creep is cancelled.

Figure 4A:
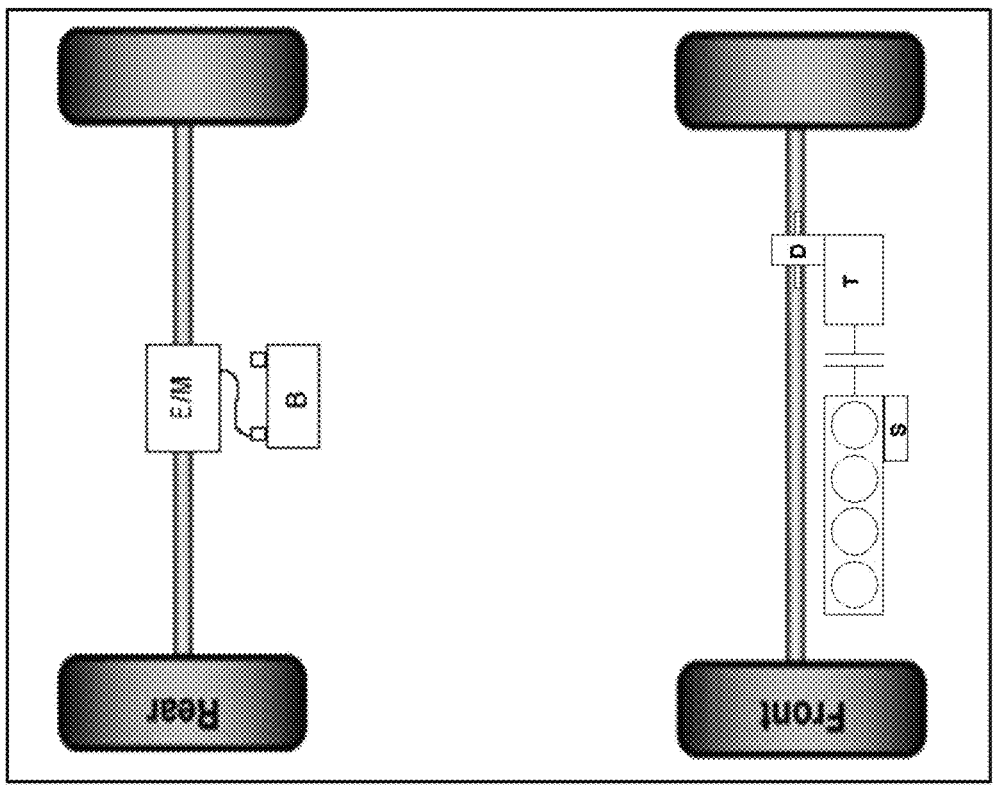
FIGS. 4A and 4B show schematically two different representative manual transmission configurations to which the representative creep/crawl strategies described herein could be applied.
Figure 4B:
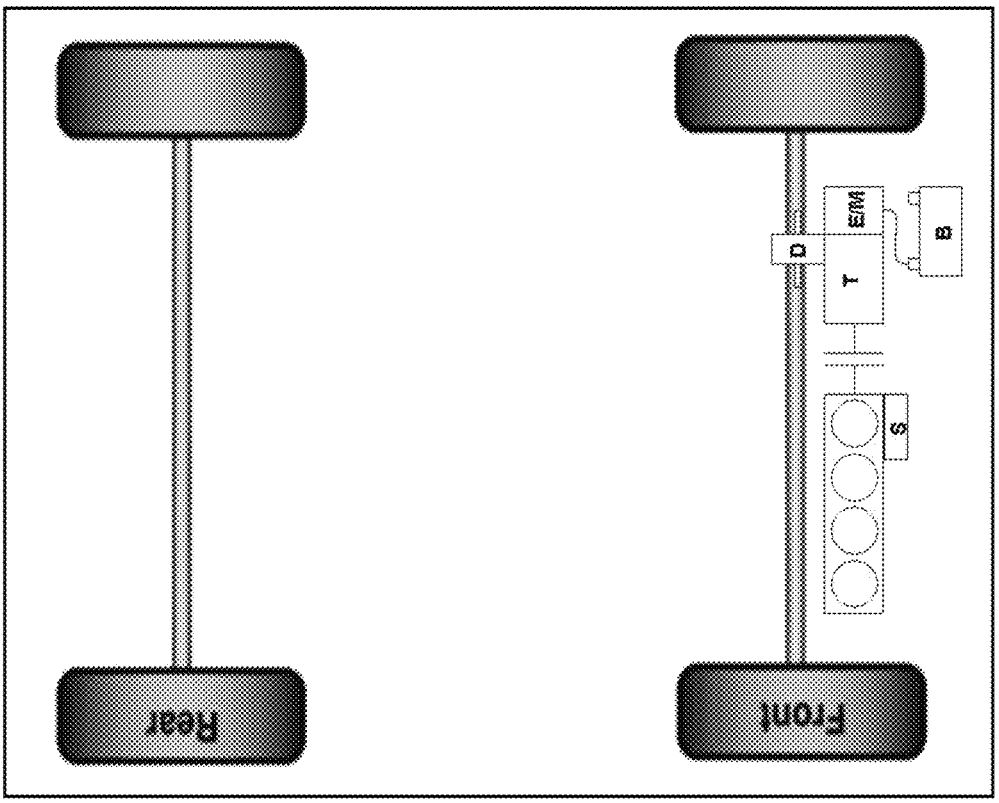

FIGS. 4A and 4B show two different manual transmission configurations to which the system 10 can be applied. In each of these illustrations the combustion engine is depicted as a series of four circles, effectively providing a top view of the cylinder block with the pistons. The other symbols represent the electric machine E/M, the battery B, the differential or final drive D, the transmission T, and the starter motor S.

FIG. 4A shows a single clutch configuration with a separate starter motor and electric machine E/M.

FIG. 4B shows an electrical rear axle drive (E-rad) system which encompasses the separation of the combustion engine from the electric machine E/M. In this configuration, the combustion engine powers the front wheels. The e-creep and e-crawl systems operate using the electric machine, which is configured to power the rear wheels.

It will be appreciated by those skilled in the art that although the claimed subject matter has been described by way of example with reference to one or more embodiments it is not limited to the disclosed embodiments and that alternative embodiments could be constructed without departing from the scope of the disclosure as defined by the appended claims.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments of the invention that may not be explicitly illustrated or described.

What is claimed is:

1. A vehicle comprising:
   an engine;
   a manual transmission coupled to the engine;
   an electric motor coupled to the engine and vehicle wheels;
   an adaptive cruise control system; and
   a controller coupled to the engine, the manual transmission, the electric motor and the adaptive cruise control system, the controller configured to:
   turn off the engine and enable electric creep mode to propel the vehicle using the electric motor responsive to the vehicle being stationary and the transmission being in neutral,
   activate electric crawl mode using the electric motor to propel the vehicle and maintain a target distance to a second vehicle when the adaptive cruise control system is on and the electric creep mode is enabled,
   exit the electric crawl mode responsive to a brake pedal being depressed, and
   exit the electric creep mode and the electric crawl mode and start the engine responsive to a clutch pedal or an accelerator pedal being depressed.

2. The vehicle of claim 1 further comprising a control button in communication with the controller operative to enable the electric creep mode.

3. The vehicle of claim 2 wherein gear selection within the manual transmission is controlled by a gear lever and wherein the control button is disposed on the gear lever.

4. The vehicle of claim 1 further comprising a traction battery configured to provide power to the electric motor, wherein the controller is configured to disable the electric creep mode and the electric crawl mode responsive to a charge level of the traction battery being below an associated threshold.

5. The vehicle of claim 1 wherein the controller is further configured to deactivate the electric creep mode and the electric crawl mode responsive to unbuckling of a driver seat belt or opening of a driver door of the vehicle.

6. The vehicle of claim 1 wherein the controller is further configured to deactivate the electric creep mode and the electric crawl mode responsive to movement of a gear shift lever of the manual transmission.

7. The vehicle of claim 1 further comprising a selector communicating with the controller to select one of a forward and reverse travel for the electric creep mode.

8. The vehicle of claim 1 wherein the controller is configured to control the electric motor to selectively provide both forward and reverse travel in the electric creep mode in response to a corresponding selector for forward or reverse travel, respectively.

9. The vehicle of claim 1 wherein the electric motor is connected to an output shaft of the manual transmission.

10. A vehicle comprising an engine, a motor, a manual transmission, and an adaptive cruise control communicating with a controller configured to:
stop the engine and enable creep mode to propel the vehicle using the motor responsive to the transmission being in neutral with the vehicle stationary; and
activate crawl mode to maintain a target distance to a forward vehicle using the motor responsive to the creep mode and the adaptive cruise control being enabled.

11. The vehicle of claim 10 wherein the controller is further configured to cancel the crawl mode responsive to activation of a brake pedal.

12. The vehicle of claim 10 wherein the controller is further configured to cancel the creep mode and the crawl mode responsive to activation of a clutch pedal.

13. The vehicle of claim 10 wherein the controller is further configured to cancel the creep mode and the crawl mode responsive to activation of an accelerator pedal.

14. The vehicle of claim 10 wherein the controller is further configured to cancel the creep mode and the crawl mode and start the engine responsive to activation of an accelerator pedal.

15. The vehicle of claim 10 further comprising a battery coupled to the motor, wherein the controller is further configured to disable the creep mode and the crawl mode responsive to a charge level of the battery being below a corresponding threshold.

16. A method of controlling a vehicle having an engine, a motor, adaptive cruise control (ACC), and a manual transmission, comprising, by a controller:
stopping the engine and enabling creep mode to propel the vehicle with the motor responsive to the transmission being in neutral with the vehicle stationary; and
enabling crawl mode to follow a forward vehicle using the motor and ACC responsive to both the creep mode and the ACC being enabled.

17. The method of claim 16 further comprising, by the controller:
starting the engine and canceling the creep mode and the crawl mode in response to activation of an accelerator pedal or a clutch pedal.

18. The method of claim 16 further comprising, by the controller:
canceling the crawl mode in response to activation of a brake pedal.

19. The method of claim 16 further comprising, by the controller:
disabling the creep mode and the crawl mode in response to a charge level of a battery configured to power the motor.

20. The method of claim 16 further comprising, by the controller:
enabling the creep mode to propel the vehicle in reverse in response to a selector switch associated with selection of forward or reverse operation.

* * * * *